United States Patent [19]

Flanagan

[11] 4,007,331

[45] Feb. 8, 1977

[54] APPARATUS FOR DEMODULATION OF RELATIVE PHASE MODULATED BINARY DATA

[75] Inventor: Robert C. Flanagan, Westlake Village, Calif.

[73] Assignee: Bunker Ramo Corporation, Oak Brook, Ill.

[22] Filed: Aug. 13, 1975

[21] Appl. No.: 604,121

[52] U.S. Cl. ................................. 178/88; 325/45; 325/65; 325/324; 325/476; 178/67

[51] Int. Cl.² ....................................... H04L 15/24

[58] Field of Search .................... 178/88, 67, 66 R; 325/344, 345, 349, 45, 47–49, 63, 65, 323, 325, 474–476; 329/112, 126, 142; 328/151

[56] References Cited

UNITED STATES PATENTS

| | | | |
|---|---|---|---|
| 3,222,454 | 12/1965 | Losee | 178/88 |
| 3,335,224 | 8/1967 | Meslener | 178/88 |
| 3,656,064 | 4/1972 | Giles | 178/66 X |
| 3,729,684 | 4/1973 | Shuda | 178/66 R X |
| 3,868,579 | 2/1975 | Dilley | 329/126 X |

Primary Examiner—Benedict V. Safourek
Assistant Examiner—Michael A. Masinick
Attorney, Agent, or Firm—F. M. Arbuckle

[57] ABSTRACT

A digital system is disclosed for demodulating relative phase-shift modulated binary data using a delay circuit to store one data bit period of sample bits for phase comparison with the next data bit period of sample bits, and a cascaded delay circuit of the same length to effectively repeat the demodulation one data bit period later. An up-down counter effectively integrates the difference between current demodulated sample bits and the demodulated sample bits of the previous data bit period to enhance data bit detection. Such data demodulation is used from a selected one of three channels, a center channel for no Doppler shift compensation, and two channels for positive and negative Doppler shift compensation. All delay circuits are implemented with random access memory units, and all units in each channel are addressed by a single counter preset each time it overflows in response to counting clock pulses to set the length of the delay circuits according to the average of any expansion or contraction of a data bit period expected due to Doppler shift.

12 Claims, 7 Drawing Figures

APPARATUS FOR DEMODULATION OF RELATIVE PHASE MODULATED BINARY DATA

BACKGROUND OF THE INVENTION

This invention relates to improvements in binary coded signal correlation in a relative phase-shift modulated carrier communication system, and more particularly to the use of a variable length shift register for adjustment to compensate for Doppler effects on the incoming carrier and to a technique for implementing the variable shift register.

Phase modulation of binary data on a carrier wave (electromagnetic or acoustic) is commonly used since the phase-shift of the carrier wave from one bit period to another is relatively easy to demodulate. In some systems the carrier is actually a subcarrier modulated on a steady-phase carrier. The latter is tracked by the receiver and used to generate a reference signal of the frequency of the subcarrier for demodulation purposes (i.e. for phase detection). However, that and other techniques for extracting a phase reference from the signal received is exploited only in electromagnetic wave transmissions due to limitations of transducers employed in acoustic wave transmissions.

In systems which do not somehow transmit a phase reference, relative binary phase modulation is employed to encode the binary data on the carrier. Each binary digit may consist of a precise number of cycles, such as seven, with a phase reversal from one digit to the next to indicate a binary 1 or 0. Assuming that phase reversal is selected to represent a binary 0, transmission of either phase (0° or 180°) may be selected for the first binary digit (bit). If a 0 is the first bit, the phase of the carrier is reversed (inverted) for the next bit period; otherwise it is not reversed so that successive bit periods of the same phase (0° or 180°) represent a data bit 1. The opposite convention could as well be selected to represent a data bit 1 by reversing the phase.

To demodulate such a relative phase-shift modulated signal, the carrier received during each bit period is stored and compared with the phase of the carrier during the next period. Each data bit period thus provides a reference phase for the next data bit period. A problem with relative binary phase-shift modulation is demodulation in the presence of Doppler shift of the carrier due to relative motion between the transmitter and receiver, particularly when the Doppler shift is not known in advance, and cannot be independently determined.

To understand this problem which arises because of Doppler shift, assume a binary bit period of the modulated carrier to consist of seven cycles of the carrier. With a positive Doppler shift, the period of the seven cycles decreases while for a negative Doppler shift the period increases. Consequently, if an attempt is made to demodulate by comparing the phase of one bit period with the phase of a succeeding bit period, an error will occur because one bit period being compared with the other will be overlapping with another bit period, and this error would be cumulative such that after demodulating a 10 or 20 bit word, the demodulaton of the last few bits would be totally unreliable. The error is, of course, the offset in the comparison of cycles in one data bit period with cycles of a succeeding data bit period. But even assuming that somehow demodulation has been properly effected in the presence of significant Doppler phase shift, there is still a problem in proper identification of the bits in the resulting (demodulated) signal.

To appreciate this last problem of identifying a properly demodulated signal in the presence of Doppler shift, consider trying to decode the first N bits of a coded transmission by comparison with an N bit code word stored at the receiver. It is common practice to transmit such a code word for comparison in order to determine when the first bit of a following message occurs, or to simply discriminate against noise where only the code word is transmitted, as when a code word is used to cause a receiver to respond in some way. An example might be to shut off a valve in a blow-out prevention system for offshore drilling platforms. Serial or parallel comparison of the coded signal received with a stored replica would be impossible, unless the replica is somehow compressed or expanded by an amount approximately equal to the amount the data bit periods of the coded signal have been compressed or expanded due to any Doppler shift caused by relative motion between the transmitter and the receiver.

In a copending application U.S. Ser. No. 604,085 filed concurrently by Michael G. Winters, and assigned to the Assignee of the present application, there is disclosed a technique for demodulating binary phase-shift modulated carrier signals and for detecting a binary code of N digits in the demodulated binary signals with greatly improved correlation through compensation for any phase shift in the carrier signal. Briefly, the technique consists of first subjecting a relative binary phase-shift modulated carrier to zero cross-over detection to produce a square-wave signal of the same frequency and phase as the carrier input signal. The resulting square-wave signal is then sampled at a predetermined rate to produce a number, S, of sample pulses during each nominal data bit period, each sample pulse being of one voltage level representing a binary 1 for one phase, and of another voltage level representing a binary 0 for the reversed phase of the sampled signal.

The resulting train of sample bits are applied to a comparator for phase comparison of each sample bit with a sample bit delayed by the nominal data bit period. Each sample bit is similarly applied to additional separate comparators for phase comparison with sample bits delayed by amounts which are greater ($+\Delta S$) than and less ($-\Delta S$) than the nominal data bit period (S) to compensate for any Doppler effect which makes the received data bit periods expand or contract. These amounts, $\pm \Delta S$, are predetermined to be approximately correct for the average positive and negative Doppler shifts expected. The train of sample bits per data bit delayed by amounts greater than and less than the nominal data bit period delay will thus be $S \pm \Delta S$, where $\Delta S$ is the number of samples which make up the period by which the data bit period has expanded or contracted.

The comparison of sample bits with delayed sample bits produces a bit 1 at a comparator output each time the two bits compared are identical; otherwise a bit 0 is produced. The result is effective demodulation free of error out of the comparator associated with the channel which provides a delay of S sample bit periods when there has been no Doppler shift on the carrier signal received. If there has been a Doppler shift, there will be an error in the demodulated output of this nominal delay channel, but there will be less error out of one of the other two delay channels, which one depending upon whether the Doppler shift has been positive or negative. If there has been a positive Doppler shift, the comparison bits from the shorter delay channel will be predominantly all ones or zeros during a contracted data bit period, and if there has been a negative Doppler shift, the comparison bits from the longer delay channel will be predominantly all ones or zeros during the expanded data bit period.

The outputs of the three comparators are separately processed through separate delay lines of a length effectively equal to the number, N, of data bits in a demodulated code word times the length of the associated comparison delay channel in terms of sample bits in the nominal, expanded and contracted data bit period, i.e. of a length effectively equal to N·S, N(S+ΔS) and N(S−ΔS). Each delay line permits continuous comparison of the stream of sample bits with the static replica of the demodulated code word, each binary digit of the replica being compared in parallel in a separate comparator with a number of successive sample bits equal to the number S, S+ΔS, and S−ΔS. When a demodulated bit agrees with a replica bit, the result of the comparison is a detection bit 1; otherwise it is a detection bit 0. Detection bits from the three comparators are separately summed over the last S, S+ΔS, and S−ΔS samples, such that after summing for a sufficient time, the sum is always of N·S, N(S+ΔS), and N(S−ΔS) possible detection bits.

The sum from each separate summing means will reach a peak when the demodulated input signal of all N data bits represented by the S, S+ΔS, or S−ΔS sample bits are properly registered in the separate delay lines. If there has been no Doppler shift on the carrier signal, the nominal delay line having a length equal to N·S will cause its detection comparator to produce a peak greater than that from either of the other detection comparators. If there has been a positive or negative Doppler shift, one or the other of the remaining detection comparators will produce the largest peak. Consequently, the comparator producing the largest peak will be from a comparison of the received data bits in the delay line which more nearly matches the Doppler shift of the received signal. The channel of the largest sum may then be selected as the one having the highest probability of containing a correct Doppler shift compensation. The largest sum is tested to determine if it is greater than a predetermined value. If so it is determined that the coded word on the carrier has been demodulated and detected.

OBJECTS AND SUMMARY OF THE INVENTION

An object of this invention is to provide an improved system for demodulating relative phase-shift modulated data on a carrier.

Another object of this invention is to provide an improved system for detecting and correlating a stored binary coded signal with a binary coded signal received through a wave propagating medium under such conditions that the bit period of the latter may have been expanded, or contracted, due to Doppler shift caused by relative motion between the transmitter and the receiver.

Still another object is to provide a variable delay shift register for use as a delay line for digital signals, the length of which is specified by a binary code.

Yet another object is to provide an improved system for demodulating a relative phase-shift modulated carrier to enhance the reliability of binary digits being detected.

These and other objects of the invention are achieved by storing S, S+ΔS and S−ΔS samples of each of N demodulated binary digit (bit) signals in three groups of N random access memory (RAM) units, operated as variable length shift registers with the units of a group connected for operation in cascade and with the three groups operated in parallel. Each RAM unit of a group receives periodic read and write control signals at the clock rate that samples of the demodulated binary signals are received to cause a sample bit to be read from an addressed memory cell into an N-bit output buffer register, and to write a new sample bit into the same memory cell. Each group of RAM units is provided with a separate address counter which is incremented after each operation to address memory cells in each unit of the group in sequence starting with an address preset into the address counter each time the counter overflows. Each address counter is provided with separate means for setting the number to be preset into its associated counter. In that manner, one counter may be preset for S−1 increments before overflow, thus providing S memory cells continually addressed in sequence. The other two counters are preset for S + (ΔS−1) and S − (ΔS+1) increments before overflow, thus providing S+ΔS and S−ΔS memory cells continually addressed in sequence in the other two groups of RAM units. The content of each output register is compared with a stored N-bit word. The comparison is made bit for bit by logic means which produces a bit 1 output when the compared bits are the same, and a bit 0 when they are not the same. The comparison output bits during each clock period are added to form an n-bit sample correlation sum, where n is a number selected such that $2^n > N$. This sample correlation sum ranges in value from zero (none of N sample bits spaced S, S+ΔS or S−ΔS bits apart match bits of the sotred N-bit word) to a maximum of N (all of N sample bits match bits of the stored N-bit word). As all S, S+ΔS and S−ΔS samples of each nominal, expanded and contracted data bit channel are thus compared with the stored N-bit word, the sample correlation sums formed are accumulated to form a running sum of the last S, S+ΔS and S−ΔS sample correlation sums. This running sum is formed in each correlation channel by operating an accumulator in the normal manner of adding a correlation sum each clock period to the content of the accumulator, and at the same time subtracting a correlation sum added S, S+ΔS or S−ΔS clock periods earlier. To save the correlation sum of a given correlation channel added each clock period for subsequent subtraction, a number of RAM units are operated in parallel, one RAM unit for each of n correlation sum bits addressed by the address counter of the given channel for the delay RAM units. The running sum of each correlation channel may be compared with the others to determine which has the greatest sum. That channel may then be selected for processing of subsequent data bits demodulated.

S, S+ΔS or S−ΔS data bit samples following the N-bit code demodulated by the selected channel demodulator are integrated in an up-down counter controlled by logic means that effectively provides at the output of the counter a number equal to the last S, S+ΔS or S−ΔS demodulating comparisons of bit samples to enhance the reliability of detecting demodulated binary digits.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
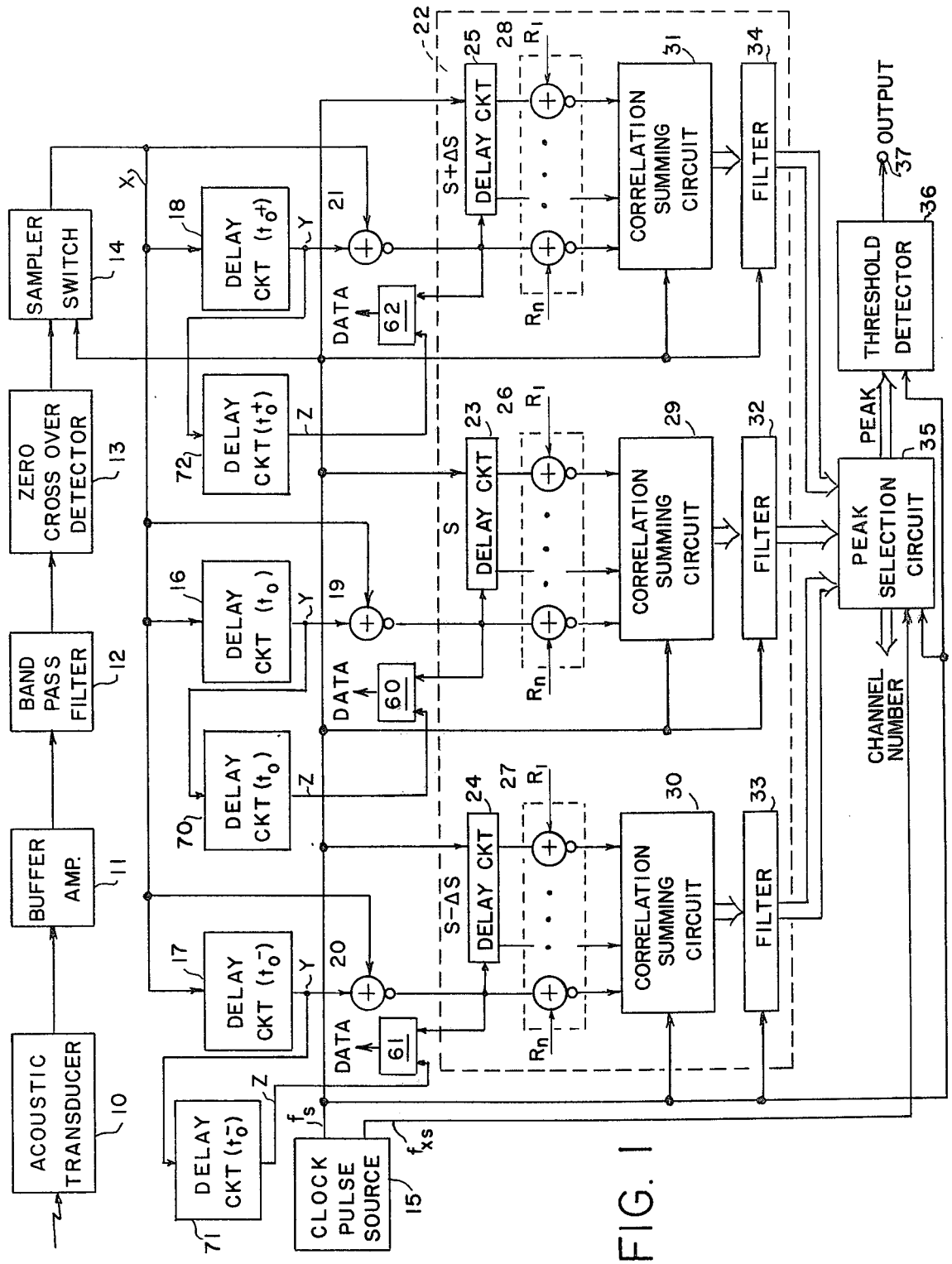
FIG. 1 is a functional block diagram of a system for demodulation, code word detection and correlation of relative phase-shift modulated binary digits using three channels, one for an assumed positive Doppler shifted carrier, one for an assumed negative Doppler shifted carrier, and one for an assumed carrier, not Doppler shifted.

Referring first to FIG. 1 to describe the system of the aforesaid copending application as an environment for the present invention, an acoustic transducer 10 receives a phase-shift modulated carrier signal that is processed through a buffer amplifier 11 and bandpass filter 12. A zero cross-over detector 13 converts the filtered signal to a square-wave signal of the same frequency and phase as the modulated carrier, and of binary logic levels representing 1's and 0's. The square-wave signal is sampled by a sampler switch 14 at a predetermined rate, $f_s$, to produce a number, S, of sample bits during each nominal data bit period.

The sample bits are applied through delay circuits 16, 17 and 18 to comparators (inverting exclusive OR circuits) 19, 20 and 21. The delay through the circuit 16 is selected to be S sample periods for demodulation of relative phase-shift modulated data when the data bit period is a nominal time $t_o$ (i.e., when the carrier has not been subjected to a Doppler shift). The delay through the circuit 17 is less than through circuit 16 for demodulation when the carrier has been subjected to a positive Doppler shift resulting in a shorter data bit period, $t_o-$, and the delay through the circuit 18 is greater than through the circuit 16 for demodulation when the carrier has been subjected to a negative Doppler shift resulting in a longer data bit period $t_o+$. Consequently, the delay circuits will, at any given time, store S, S−ΔS and S+ΔS sample bits, where ΔS is the number of sample bit periods by which an average Doppler shift expected in the carrier has contracted or expanded the periods of data bits phase-shift modulated on the carrier.

The outputs of the inverting exclusive-OR circuits 19, 20 and 21 are processed through separate channels of a detector-correlator 22 to detect the receipt of an N-bit coded word, and to determine which channel has the higher probability of containing the correct Doppler shift compensation in the delay circuits 16, 17 and 18 for the most reliable demodulation of relative-phase-shift modulated binary data. Delay circuits 23, 24 and 25 receive N·S, N(S−ΔS) and N(S+ΔS) sample bits. As the train of sample bits pass through these delay circuits, they are compared with N-bits of a code word $R_1 \ldots R_n$ in comparators 26, 27 and 28, each of which is implemented with N inverting exclusive-OR circuits having their input terminals for the sample bits spaced S, S−ΔS and S+ΔS sample bits apart. For example, if the delay circuit 23 were implemented with a conventional shift register, it would have (N−1)S stages with its last stage connected to the comparator for comparison with the stored code bit $R_1$. The remaining stored code bits $R_2 \ldots R_n$ would be successively connected to stages spaced the number S apart counting from the last stage. Once the delay circuit 23 has been filled with the (N−1)S sample bits of a demodulated code word (the Nth set of S samples for an N-bit code are in the delay circuit 16), the code word can be detected by the comparator 26, but it is not possible to know when that will occur.

Figure 2:
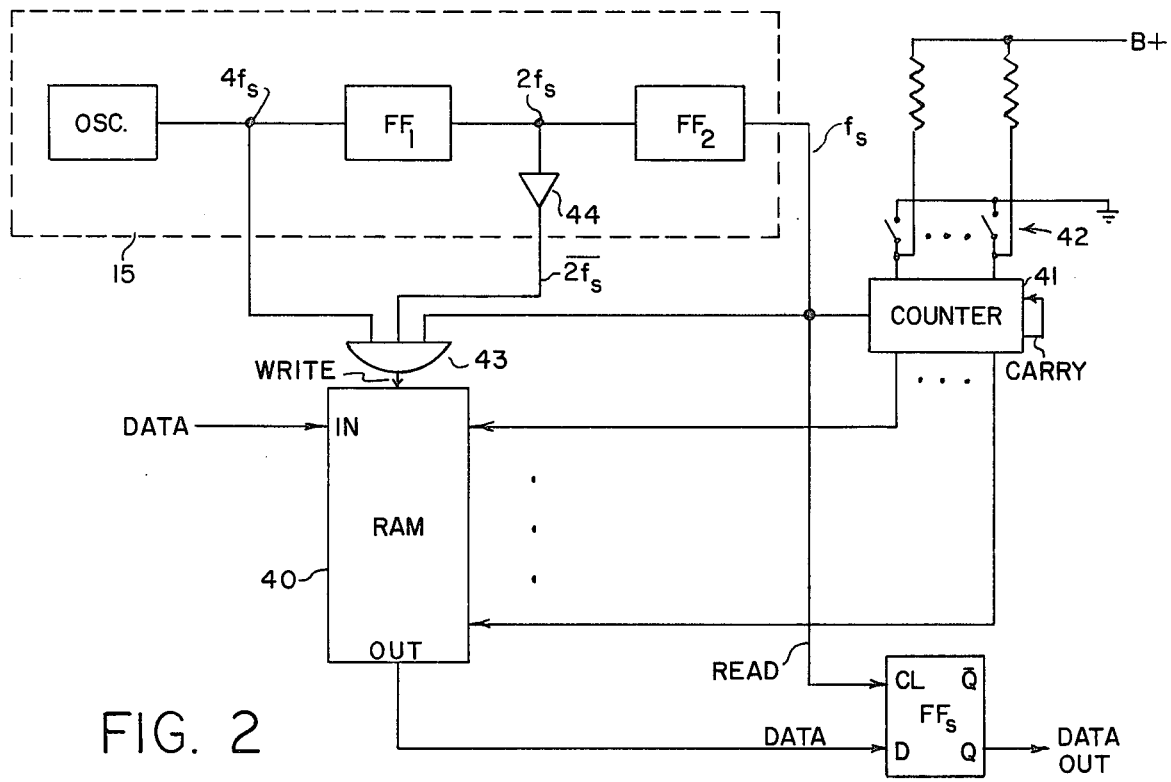
FIG. 2 is a functional block diagram of an improved implementation of the delay circuits for use in the system of FIG. 1.

Assuming no Doppler shift, so that the center channel is precisely tuned, the sum of the comparator output bits will be the greatest when the demodulated samples are properly registered in the delay circuit 23 which will ideally be a condition maintained for S sample bit times following the first (N−1)S sample bits. Therefore detection of the peak sum may be used to not only signal that the code word has been decoded, but that processing of any following bits demodulated may commence, provided the peak meets a predetermined threshold value. However, in the presence of any Doppler shift, detection of a code word and processing of following data bits from the center channel is not reliable. Operation of the other two channels tuned to an expected average negative and positive Doppler shift permits selection of the output of the demodulator tuned the closest. That is done by: forming a correlation sum in summing circuits 29, 30 and 31 in the respective nominal, upper and lower Doppler shift channels; filtering the correlation sums to remove noise and switching transients through filters 32, 33 and 34, and selecting the channel having the largest correlation sum in a circuit 35, provided that sum is greater than a predetermined value determined by a threshold detector 36, as indicated by a signal at an output terminal 37. The following demodulated data bits from that channel can then be used with greater reliability than from other channels. It is, of course, obvious that additional channels may be added, each with different amounts of positive and negative Doppler compensation for finer tuning, or for tuning over a wider range of Doppler shift, but it would be sufficient to employ electronically variable delay circuits to retune as necessary, such as under control of a programmed digital computer, or even the control of an operator. FIG. 2 illustrates an electronically variable delay circuit according to one aspect of the present invention to not only implement the demodulation delay circuits 16, 17 and 18, but also to implement detection and correlation channels in an improved form.

Referring now to FIG. 2, a delay circuit is implemented with a random-access memory (RAM) 40 having $2^n$ memory cells, where $2^n \geq S+\Delta S$. The cells are addressable by a conventional binary counter 41 having $n$ stages, except that upon overflowing, it does not recycle to zero in the usual way. Instead, the overflow (carry) is used to set the counter to a preset value which is the 2's complement of the desired number of memory cells to be placed in a chain by the sequential operation of the counter. For example, assume the simple case of a 16 cell memory addressed by a four-bit counter which counts through 16 states that may be numbered zero to fifteen in the decimal system (0000 to 1111 in the binary system). If a chain of 11 cells is desired, the 2's complement of the binary equivalent of 11 is the preset value, which is the 1's complement of the eleventh binary number (1011) in the sequence of binary numbers from 0000 to 1111, namely 0100, plus 1. The "plus 1" converts the 1's complement to the 2's complement. There are precisely eleven binary numbers from 0101 through 1111. When the maximum count of 1111 is reached, the counter recycles, not to 0000, but to 0101 in response to the next clock pulse using the CARRY to preset the counter.

This scheme will, of course, apply equally well to a RAM addressed by any other form of counter, such as a decimal counter, or binary coded decimal counter. One need only work out the required 2's complement to be preset into the counter by a CARRY from any predesignated stage in the counter. A set of switches 42 is shown for setting up the 2's complement, but in some applications, the switches might be flip-flops set by a programmed digital computer or other data processor, such as when sweeping a range of Doppler shift compensations for one that will yield optimum results under particular operating conditions in the field.

Figure 3:
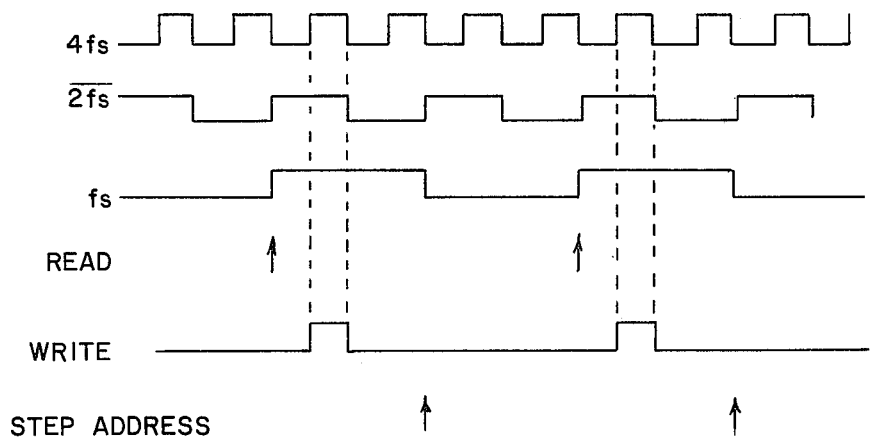
FIG. 3 is a timing diagram useful in understanding the system of FIG. 2.

The counter 41 receives clock pulses at a frequency $f_s$ from the source 15 implemented as shown in FIG. 2 using a crystal osciallator OSC operating at a frequency $4f_s$. Two flip-flops $FF_1$ and $FF_2$ divide the oscillator frequency down to $2f_s$ and $f_s$. An AND gate 43 receives the oscillator output at the frequency $4f_s$, the output of the flip-flop $FF_1$ via an inverter 44, and the signal from the flip-flop $FF_2$ at the frequency $f_s$ to form WRITE pulses as shown in FIG. 3. The counter 41 steps at the trailing edge of the pulses at the frequency $f_s$ after the RAM is read out at the leading edge and a new data bit is read in by the WRITE pulse. The bit read out of the cell at the new address is stored in a D-type flip-flop $FF_3$.

Since a cell just read and filled with a new bit is not again read until the counter has made a complete cycle through an overflow (carry) to the same address, the result is as though that bit were propagated through a conventional shift register having as many stages as provided in one cycle of the counter. It is thus evident that an improved delay circuit is provided which can be electronically adjusted to any length between the limits of zero and the maximum count $2^n$ of the counter: each of the delay circuits 16, 17 and 18 of FIG. 1 is implemented in accordance with the present invention.

Figure 4:
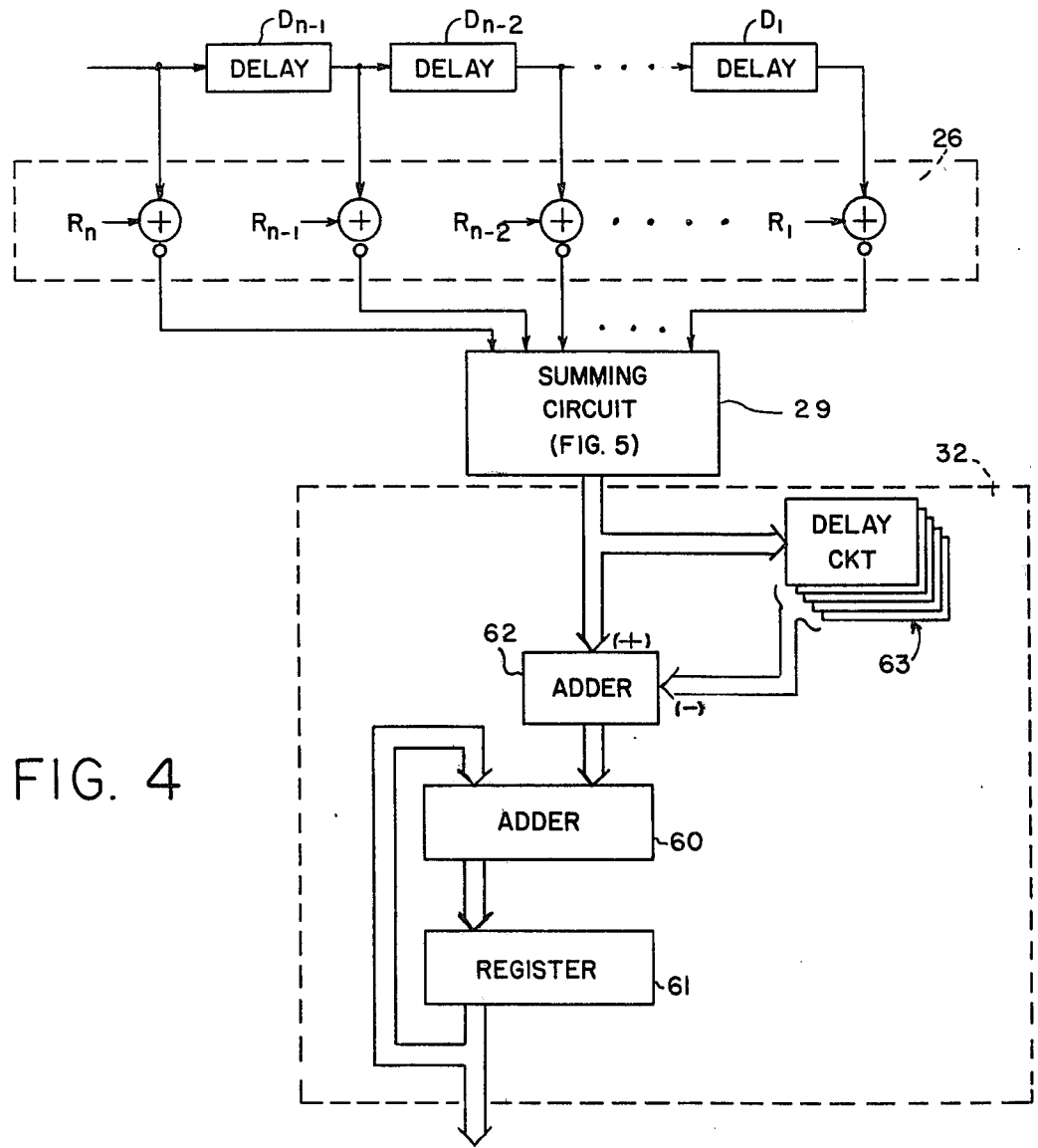
FIG. 4 is a functional block diagram illustrating an improved implementation of code word detection and correlation channel for the system of FIG. 1.

The delay circuit of FIG. 2 is also employed to implement the delay circuits 23, 24 and 25 in the detector-correlator 22 of FIG. 1, and in the same way, except that a plurality of delay circuits are connected in cascade, as shown in FIG. 4, to make up delay circuits that are N·S, N(S−ΔS) and N(S+ΔS) stages (cells) long.

In the practice of this invention, all or part of the circuits in FIG. 2 may be implemented as large scale integrated (LSI) circuits. However, when multiple delay circuits are required, the clock source 15 and the AND gate 43 need to be implemented only once, as the $4f_s$, $2f_s$, $f_s$ and WRITE signals may be common to all delay circuits. Also, the counter 41 and the presetting means 42 need to be implemented only once for each delay length required, as the outputs of the counter stages may be common to all RAM's operating in delay circuits of the same length. A specific RAM and output flip-flop must be provided for each delay circuit, though several of these functions may be on a single LSI chip. For example, in the system of FIG. 1, only one clock source is required for all delay circuits. Three counters and presetting means are required for each of the S, S+ΔS, and S−ΔS delay lengths. One is required to operate the S-sample delay circuits 16 and 23, one for the S−ΔS delay circuits 17 and 24, and one for the S+ΔS delay circuits 18 and 25. Delay circuits required in the Correlation Summing Circuits 29, 30, 31 (discussed below) may also be operated from their respective counter and presetting circuits.

Referring now to FIG. 4, and assuming the detection and correlation channel shown is for the nominal data, i.e. demodulated data from the comparator 19, the sample bits are delayed by delay circuits $D_1, D_2 \ldots D_{N-1}$, where the letter N in the subscript is the number of data bits to be decoded in a code word. Each delay circuit has S cells to store all sample bits of a data period. One less delay circuit than data bits is required because samples of the Nth data bit are available at the input of the chain of delay circuits for comparison in the comparator 26 comprised of N inverting exclusive-OR circuits as shown. As the train of sample bits (S samples of each demodulated data bit) pass through the chain of delay circuits, they are compared with the preset code bits $R_1$ through $R_N$. If a given sample bit is the same as a code bit, i.e., if both are 1 or both are 0, the exclusive-OR function of the comparator produces a bit 0 output, and the inverting function of the comparator produces a bit 1 as the final output. Otherwise the final output is a bit 0. In practice, conbinational logic common in LSI circuits would use the direct output of any exclusive-OR circuit; the inversion would be effected by the judicious choice of the components elected to implement the correlation summing circuit 29.

As the N comparator output bits are presented to the correlation summing circuit 29 (S sets of N bits per data bit period), the correlation summing circuit develops a sum of each of the sets of N bits. If N is equal to 19, for example, a five-bit sum is generated for each set every cycle of the clock $f_s$.

Figure 5:
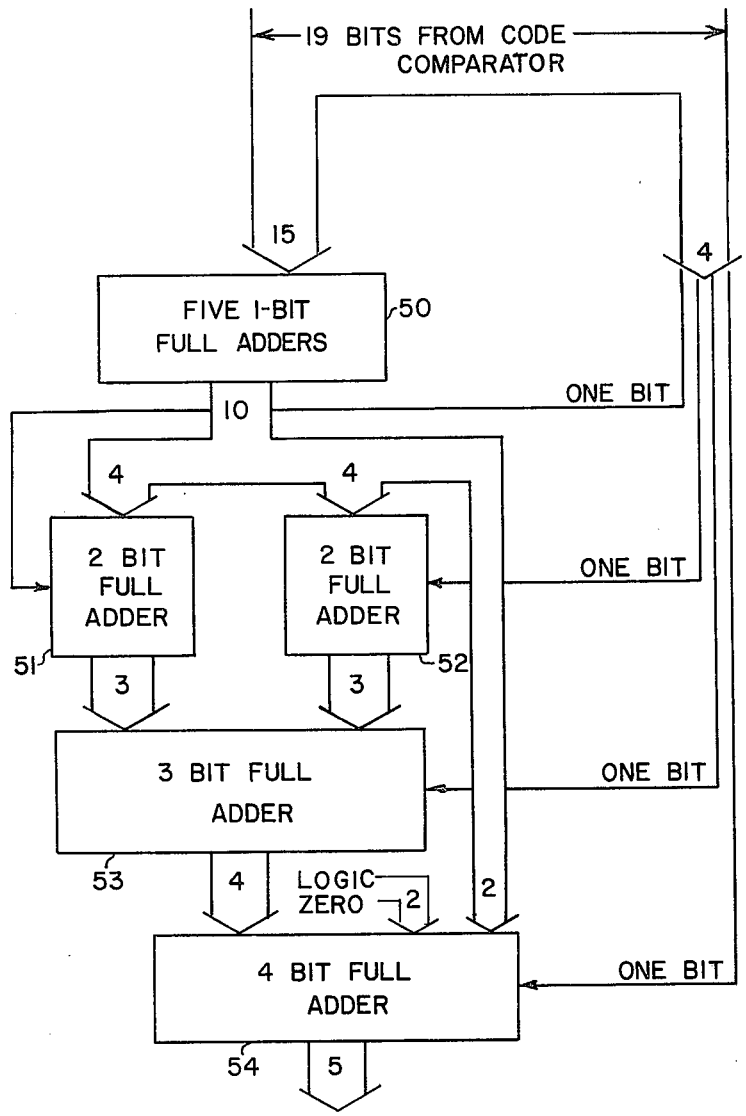
FIG. 5 is a block diagram illustrating an examplary implementation of a correlation summing circuit.

FIG. 5 illustrates one organization for the summing circuit if, for example, N is equal to 19. A block 50 of five one-bit full adders receives 15 of the 19 input bits, to produce a 10-bit sum comprised of five two-bit words. Each adder receives one bit at its augend input, one bit at its addend input, and one bit at its carry input, and produces one bit at its sum output and one bit at its carry output. Since all 19 bits are to be weighted equally the 15 bits added in block 50 may be selected arbitrarily. Four arbitrarily selected sets of two-bit words from the output of the block 50 are added in a pair of two-bit full adders 51 and 52, with two of the bits remaining from the original 19 input bits being added as carry inputs. The result is a pair of two-bit sums, each with a carry, or a three-bit output from each. These six bits are added in a three-bit full adder with one of the remaining input bits being added as a carry input. The result is a three-bit sum plus a carry bit. These four bits, and the remaining two bits from the block 50, are added in a four-bit full adder, with the remaining one of the original 19 input bits being added as a carry input. A four-bit input may be 15 (binary 1111) while the maximum from one of the one-bit full adders in block 50 is three (binary 11). The sum which the four-bit full adder 54 must handle is thus 18 (binary 10010). If the remaining input is also a bit 1, the total sum developed is thus 19 (binary 10011). Two of the input terminals of the four-bit adder are thus not used, i.e., are tied to a logic 0 level.

Figure 6:
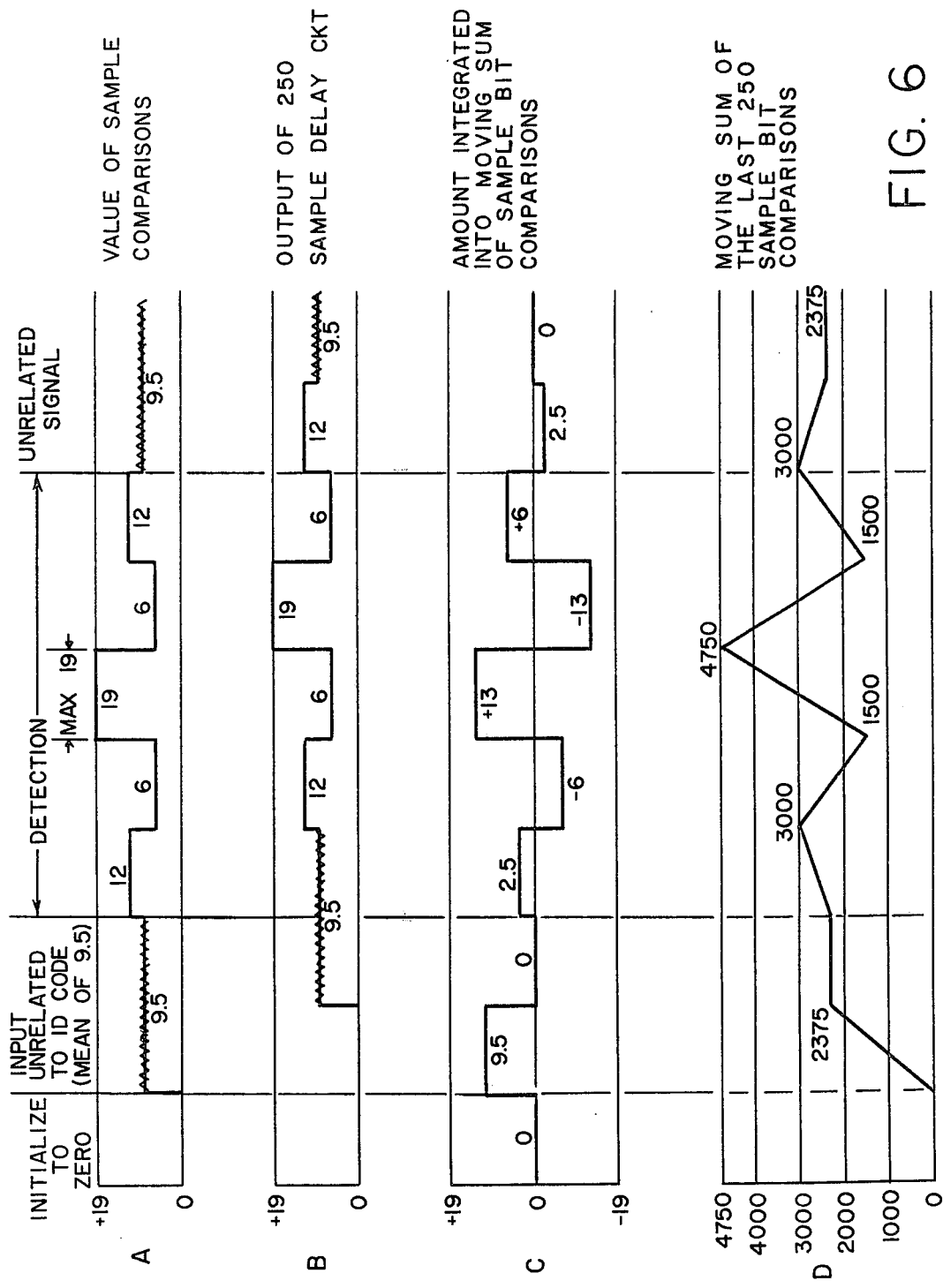
FIG. 6 shows in graphs the typical sequence of operation of the nominal correlation channel (S=250).

As the train of sample bits enters and then leaves the chain of delay circuits in FIG. 4, a peak sum of N=19 is reached, as shown by graph A in FIG. 6. When all data bits are in the chian of delay circuits, the first N−1 bits are in the delay circuits $D_1$ through $D_{N-1}$ and the Nth bit is effectively in the delay circuit 16 of FIG. 1. Ideally this condition will persist for S sample periods. A peak will be similarly reached in the delay circuits 24 and 25, but if it is assumed there was no Doppler shift, the peaks there will be lower. A condition of no Doppler shift will rarely occur, so it is necessary to filter the sums of the correlation summing circuits and test for the channel having the highest peak.

To filter the outputs of the correlation summing circuits 29, 30 and 31, the sums formed during the last S, S−ΔS and S+ΔS sample clock periods are accumulated, thus producing the graph D of FIG. 6. How that is accomplished in each channel will be described with reference to the nominal channel shown in FIG. 4. The other channels are identical except that S becomes S−ΔS and S+ΔS for positive and negative Doppler shift, respectively.

For illustration, again assume that N is equal to 19 and also that S is equal to 250. Each five-bit sum from the summing circuit 29, added in a 13-bit adder 60 to a sum stored in a 13-bit register 61, is first added to the 2's complement of a delayed five-bit sum on a six-bit adder 62, thus presenting the adder 60 only with the difference between the current five-bit sum and one which occurred S, or 250, sample bit periods earlier. A bank 63 of five delay circuits, each identical to the one shown in FIG. 2, is used to delay a sum currently being added for S sample bit periods, after which delay it is subtracted by adding its 2's complement in the adder 62. The 2's complement is formed by simply taking the complementary ($\bar{Q}$) outputs of the buffer flip-flops at the outputs of the delay circuits. That presents the adder 62 with the 1's complement to which a bit 1 is added to form the 2's complement simply by tieing the carry input of the adder to a logic 1 level. The output of the filter, which is the running sum of the last S five-bit sums is a 13-bit sum the value of which follows graph D of FIG. 6.

Graphs A and B represent the demodulated sample bits from the demodulator, and as delayed one data bit period, respectively, over six data bit periods. The difference between graphs A and B, shown in graph C, is the running sum desired, and graph D is the integration of the N·S sample bits in graph C, i.e., the running sum of the last N·S samples where S for the nominal delay channel is 250. Note that the peak N·S=4750 is reached at the trailing edge of the peak (+13) in graph C which corresponds to the trailing edge of the peak in demodulated sample bits (graph A). The peak in graph D is more pronounced and therefore more susceptible to threshold detection.

The selection circuit 35 (FIG. 1) receives three 13-bit sums every sample clock period and tests for the largest value in three parallel tests according to the following table:

| TEST | B & C | A & C | A & B | LARGEST |
|---|---|---|---|---|
| 1 |  | A C | A B | A(01) |
| 2 | C B | A<C |  | C(10) |
| 3 | C<B |  | A<B | B(11) |

Where: A is the nominal channel; B is the positive Doppler channel; and C is the negative Doppler channel. The last column indicates the channel having the largest value on the basis of the three tests: A ⩾ C, A ⩾ B, and C ⩾ B. Note that if the first test A ⩾ C is not true, A<C is true, and if C ⩾ B is also true, C is the channel having the largest value. Similarly, if A ⩾ B is not true, A<B, and if C ⩾ B is not true, C<B, in which case B is the channel having the greatest value. A is the channel having the greatest value only if both A ⩾ C and A ⩾ B are true. Both the greatest value, and a binary code identifying the channel, are stored in an output register so that both are separately available, but only if the peak value thus selected is larger than the previous peak stored. In that manner the largest peak and its channel identification number are stored. The peak value is tested by the threshold detector 36 to determine whether it is of a minimum acceptable value. The channel number is available for selecting the corresponding channel for subsequent demodulated data as the most reliable once the threshold detector produces an output signal.

Following the ID code thus detected by the detector-correlator there may be a "begin message" code which will enable the receiver to distinguish when the ID code has been completed and a message is begun. If the ID code is itself the message, the output of the threshold detector itself may be a command, for example, a command from an oil drilling platform that will cause a valve to be closed in a blow-out preventer stack.

In the event a following message is to be received and processed from the channel selected, it can be taken from the output of the demodulator of that channel, which is at the input of the detector-correlator. However, to enhance the reliability of the data, digital integrating demodulators 60, 61 and 62 are employed as shown in FIG. 1 to integrate each demodulated bit over one information bit time as shown in FIG. 7.

Figure 7:
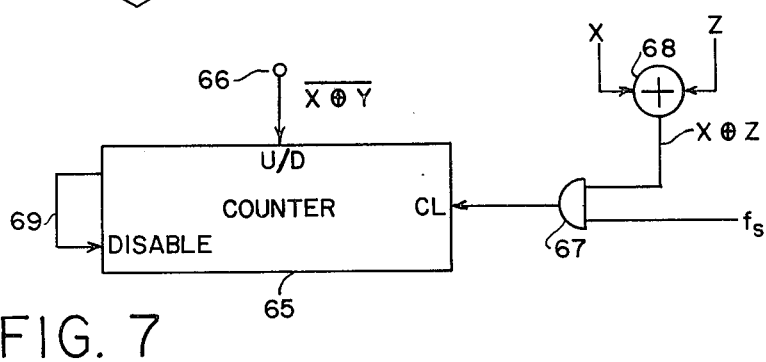
FIG. 7 is a functional block diagram of a bit correlator for demodulation of relative phase-shift modulated binary digits.

Referring to FIG. 7, an up-down counter 65 is used to sum the last S, S+ΔS or S−ΔS in-phase sample bits forming a correlated output which represents the degree of phase match of the input over the last two bit times; i.e., the "one-ness" of the last information bit. The sum of the last S, S+ΔS or S−ΔS demodulated samples is formed by effectively adding (counting up) new in-phase comparisons at terminal 66 (the output of the selected demodulator 19, 20 or 21), and effectively subtracting (counting down) these comparisons one data bit period later, i.e., S, S+ΔS or S−ΔS samples later under control of an AND gate 67 and an exclusive-OR circuit 68. The counter is inhibited from counting up past full capacity or below zero by a disable feedback 69. A separate delay circuit 70, 71 or 72 shown in FIG. 1, is required for this integrated demodulation, the delays being S, S−ΔS and S+ΔS respectively.

In order to achieve the desired integrated demodulation, i.e., forming the running sum of the last S, S+ΔS or S−ΔS sample bits demodulated, using only an up-down counter, and not an adder, to add comparisons as they occur and substract the same comparisons one data bit period later, the output of the selected demodulator at the terminal 66 controls the counter to count up when the demodulated bit sample is 1 and to count down when it is 0. Normally a bit 0 from the demodulator would mean that nothing should be added to the accumulated sum, but here it is used to command a subtraction from the accumulated sum, but only if a demodulated bit 1 sample one data bit period old is to be subtracted. The following table will be helpful in understanding the operation of the circuit of FIG. 7 where X is a sample bit from the sampler switch 14, Y is a sample bit delayed one data bit period in the selected demodulating channel, and 2 is a sample bit delayed a second data bit period in the selected channel, as shown in FIG. 1.

| SIGNAL | | | COMPARISONS | | | NET EFFECT |
|---|---|---|---|---|---|---|
| X | Y | Z | $\overline{X \oplus Y}$ | $\overline{Y \oplus Z}$ | $Z \oplus Z$ | |
| 0 | 0 | 0 | 1 | 1 | 0 | 0: No Count |
| 0 | 0 | 1 | 1 | 0 | 1 | +1: Count Up |
| 0 | 1 | 0 | 0 | 0 | 0 | 0: No Count |
| 0 | 1 | 1 | 0 | 1 | 1 | −1: Count Down |
| 1 | 0 | 0 | 0 | 1 | 1 | −1: Count Down |
| 1 | 0 | 1 | 0 | 0 | 0 | 0: No Count |
| 1 | 1 | 0 | 1 | 0 | 1 | +1: Count Up |
| 1 | 1 | 1 | 1 | 1 | 0 | 0: No Count |

Note that the table does not purport to represent a train of sample bits being demodulated, but rather only all eight possibilities or combinations of bits at points X, Y and Z at any given time. The column headed $\overline{X \oplus Y}$ is the output of the selected demodulator at the terminal 66 in FIG. 7. The column headed $\overline{Y \oplus Z}$ is representative of demodulated sample bits one data period old. Consequently, to form a running sum, a bit 1 in the column $\overline{X \oplus Y}$ should be added while a bit 1 in the column $\overline{Y \oplus Z}$ should be subtracted in any given one of the eight possible states. The function $\overline{Y \oplus Z}$ is not, however, performed. Instead the exclusive-OR function $X \oplus Z$ is formed and used to gate a clock pulse to the counter through the AND gate 67 when $X \oplus Z = 1$ to count up or down, up if $\overline{X \oplus Y} = 1$ and $\overline{Y \oplus Z} = 0$, and down if $\overline{X \oplus Y} = 0$ and $\overline{Y \oplus Z} = 1$, and to not gate a clock pulse when $\overline{X \oplus Y}$ and $\overline{Y \oplus Z}$ are equal, i.e., both are equal to 1 or to 0. Such an up, down or no count control of the up-down counter through the comparisons $\overline{X \oplus Y}$ and $X \oplus Z$ will satisfy the requirement of forming a running sum.

Although particular embodiments of the invention have been described and illustrated herein, it is recognized that modifications and variations may readily occur to those skilled in the art. It is therefore intended that the claims be interpreted to cover such modifications and variations.

The embodiments of the invention in which an exclusive property or privilege is claimed are described as follows:

1. In a communication system having a carrier signal modulated by reversing the phase of the carrier 180° from one data bit period to the next for representation of a digit of one value and not reversing phase from one data bit period to the next for representation of a digit of the other value, a digital demodulation system comprising
    means for converting said carrier to a square-wave electrical signal of the same phase and frequency as said carrier,
    means for sampling said square-wave signal at a rate greater than said carrier frequency to produce a number, S, of sample bits for each data bit period,
    first delay means for storing each sample bit for one data bit period,
    means for comparing the phase of each stored sample bit with a current sample bit, thereby demodulating a sample bit in response to each in-phase comparison, and
    means for integrating the last S demodulated sample bits over exactly one data bit period.

2. Apparatus as defined in claim 1 wherein said means for integrating demodulated sample bits is comprised of
    an up-down counter having a control terminal responsive to each comparison for counting up when a current sample bit matches a stored sample bit from said storage means,
    additional delay means for storing each stored sample bit for one additional data bit period,
    means for comparing the phase of each additionally stored sample bit with a current sample bit to produce a pulse to be counted when not of the same phase, whereby said up-down counter counts up only when said demodulated sample bit indicates an in-phase comparison and only counts down when said demodulated sample bit does not indicate an in-phase comparison, each only when said pulse to be counted is produced.

3. Apparatus as defined in claim 2 including a source of clock pulses for synchronizing said sampling means with said first delay means and said additional delay means, and wherein each of said delay means is comprised of
    a random access memory having cells addressable in numerical sequence from from some minimum address number to some maximum address number,
    means responsive to said clock pulses for generating said sequence of address numbers, one number for each clock pulse,
    means responsive to said maximum number for recycling said generating means from said maximum number to a preselected number between said minimum and maximum numbers in response to the next clock pulse,
    means for setting said preselected number, and
    means responsive to each of said clock pulses for reading out the content of an addressed cell and storing a new sample bit into said addressed cell before generating the next address number in sequence.

4. Apparatus as defined by claim 3 wherein said means for generating said sequence of address numbers is a counter for counting said clock pulses, and said recycling means is comprised of means for presetting said counter to said preselected number in response to a carry signal from said counter when it overflows upon counting the next clock pulse after reaching a count of said maximum number.

5. A digital system for demodulating a phase shift modulated carrier where the phase of said carrier is reversed 180° from one data bit period to the next to represent binary values 1 and 0, and not reversed from one data bit period to the next to represent the other of binary values 1 and 0, comprising
    a source of clock pulses, means for converting said carrier to a square-wave electrical signal of the same frequency and phase as said carrier, and of binary 1 and 0 levels, means responsive to said clock pulses for sampling said square-wave signal at a rate higher than said carrier frequency selected to produce a predetermined number, S, of sample bits during each data bit period, first and second delay means in cascade, each for delaying said sample bits one data bit period, first and second means for comparing the phase of sample bits directly from said sampling means with sample bits delayed by said first and second delay means respectively, an up-down counter having an up-down control terminal connected to said first comparing means to count up in response to clock pulses only when there is equality of phase in sample bits being compared by said first comparing means, and having an input terminal for said clock pulses to be counted, and gating means for gating said clock pulses to said clock input terminal of said counter only when there is not equality of phase in sample bits being compared by said second comparing means, whereby said counter continually integrates the last S sample bits found to be in phase over exactly one data bit period.

6. The combination of claim 5 wherein said counter includes means for inhibiting it from counting up through its maximum count, and from counting down through zero.

7. A digital system for demodulating data modulated on a carrier by reversing the phase of the carrier 180° from one data bit period to the next for representation of a digit of one binary value and not reversing phase from one data bit period to the next for representation of a digit of the other binary value, comprising a source of clock pulses, means for converting said carrier to a square-wave electrical signal of the same phase and frequency as said carrier, means responsive to said clock pulses for sampling said square-wave signal at a rate greater than said carrier frequency to produce a number, S, of sample bits for each data bit period, delay means for storing each sample bit for one data bit period, said means comprising a random access memory having cells addressable in numerical sequence from some minimum address number to some maximum address number and an output buffer flip-flop, means responsive to said clock pulses for generating said sequence of address numbers, one number for each clock pulse, means responsive to said maximum number for recycling said generating means from said maximum number to a preselected number between said minimum and maximum numbers in response to the next clock pulse, means for setting said preselected number, and means responsive to each of said clock pulses for reading out into said buffer flip-flop the content of an addressed cell and storing a new data bit into said addressed cell before generating the next address number in sequence, means for comparing the phase of each sample bit read into said output buffer flip-flop with undelayed sample bits.

8. A digital system as defined in claim 7 including two additional delay means, all of said delay means being identical with said one delay means for storing each sample bit for one data bit period having its preselecting means set to a number selected such that an overflow occurs after S clock pulses and said two additional delay means having their preselecting means set, one to a number selected such that an overflow occurs after $S-\Delta S$ clock pulses and the other to a number selected such that an overflow occurs after $S+\Delta S$ clock pulses, and two means for separately comparing the phase of each sample bit read into output buffer flip-flops of said two additional delay means with undelayed sample bits, thereby demodulating said sampled square-wave signal with compensation for positive Doppler and negative Doppler shift, while the output buffer flip-flop of said one delay is compared with undelayed sample bits to demodulate said sampled square-wave signal without compensation for Doppler shift, and means for selecting the demodulation channel producing a signal having the most detectable binary coded signal in a first group of a predetermined number, N, of successive data bit periods.

9. A digital system as defined in claim 8 wherein said first group of successive data bit periods is comprised of an N-bit code and said last named means is comprised of three extended delay means, one for each comparing means for delaying each demodulated sample bit, each delay means comprising N−1 cascaded sections, each section comprising a random access memory addressed by the counter of the one of said demodulating delay means from which said demodulated sample bits are derived, each random access section having an output flip-flop, means for continually code comparing separately, the output of each phase comparing means and the output buffer flip-flops of cascaded delay sections of said three extended delay means with said N replica code bits to produce a bit 1 for each demodulated sample bit matching a code bit, and means for continually adding separately the bits from each N-bit code comparing means to develop for each a correlation value which reaches a higher value for the comparing means associated with the demodulating delay means having a delay period most nearly matching any Doppler shift of said carrier.

10. A digital system as defined in claim 9 including three means for separately accumulating the correlation values of said adding means over the last N·S, $N(S-\Delta S)$ and $N(S+\Delta S)$ demodulated sample bits.

11. A digital system as defined in claim 10 wherein each accumulating means comprised summing means for adding each correlation value developed during each clock period and a register for storing the sum, said summing means including means for subtracting each correlation value delayed through a delay circuit comprising a plurality of parallel delay sections, one for each bit of said correlation value, each section comprising a random access memory addressed by the counter of the one of said demodulating delay means from which said correlation values are derived, each random access section having an output buffer flip-flop.

12. A digital system as defined in claim 11 including synchronized means for continually storing the largest sum of said three accumulating means and a number identifying the accumulating means from which the largest sum stored was derived.

* * * * *